(12) United States Patent
Satish et al.

(10) Patent No.: US 8,914,888 B1
(45) Date of Patent: Dec. 16, 2014

(54) SYSTEMS AND METHODS FOR CLASSIFYING AN UNCLASSIFIED PROCESS AS A POTENTIAL TRUSTED PROCESS BASED ON DEPENDENCIES OF THE UNCLASSIFIED PROCESS

(75) Inventors: Sourabh Satish, Fremont, CA (US);
Shane Pereira, Newbury Park, CA (US);
Adam Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1043 days.

(21) Appl. No.: 12/603,429

(22) Filed: Oct. 21, 2009

(51) Int. Cl.
*G06F 11/00* (2006.01)

(52) U.S. Cl.
USPC ............... 726/24; 726/22; 726/23; 709/223; 709/224; 719/316; 719/328

(58) Field of Classification Search
CPC ......... G06F 21/00; G06F 21/12; G06F 21/50; G06F 21/51; G06F 21/52; G06F 21/125
USPC .......... 709/223, 224; 719/316, 320, 321, 328, 719/330; 380/30; 726/22, 23, 24
See application file for complete search history.

(56) References Cited

U.S. PATENT DOCUMENTS

| 7,024,555 B2 * | 4/2006 | Kozuch et al. ................. 726/22 |
| 7,127,579 B2 * | 10/2006 | Zimmer et al. ............... 711/163 |
| 7,472,420 B1 * | 12/2008 | Pavlyushchik ................. 726/24 |
| 7,650,492 B2 * | 1/2010 | Sherwani et al. ............. 713/151 |
| 7,900,046 B2 * | 3/2011 | Baliga et al. .................. 713/169 |
| 7,971,255 B1 * | 6/2011 | Kc et al. ......................... 726/24 |
| 8,220,029 B2 * | 7/2012 | Zhang et al. ..................... 726/1 |
| 8,230,499 B1 * | 7/2012 | Pereira ........................... 726/22 |
| 8,434,151 B1 * | 4/2013 | Franklin ........................ 726/24 |
| 8,522,042 B2 * | 8/2013 | Barron et al. ................. 713/189 |
| 2003/0188173 A1 * | 10/2003 | Zimmer et al. .............. 713/189 |
| 2005/0091494 A1 * | 4/2005 | Hyser ........................... 713/171 |
| 2007/0033420 A1 * | 2/2007 | Sherwani et al. ............ 713/193 |
| 2007/0199000 A1 * | 8/2007 | Shekhel et al. .............. 719/330 |
| 2007/0226493 A1 * | 9/2007 | O'Brien et al. .............. 713/166 |
| 2007/0256082 A1 * | 11/2007 | Bhagwan et al. ............ 719/316 |
| 2008/0101597 A1 * | 5/2008 | Nolan et al. .................... 380/30 |
| 2009/0187763 A1 * | 7/2009 | Freericks et al. ............ 713/167 |
| 2010/0005481 A1 * | 1/2010 | Lewis et al. .................. 719/320 |
| 2011/0173643 A1 * | 7/2011 | Nicolson et al. ............ 719/328 |
| 2011/0289517 A1 * | 11/2011 | Sather et al. ................. 719/321 |
| 2012/0110174 A1 * | 5/2012 | Wootton et al. ............. 709/224 |
| 2013/0318568 A1 * | 11/2013 | Mahaffey et al. ............... 726/3 |
| 2014/0013435 A1 * | 1/2014 | Palumbo et al. ............... 726/24 |

* cited by examiner

*Primary Examiner* — Thu Ha Nguyen
(74) *Attorney, Agent, or Firm* — Holland & Hart LLP

(57) ABSTRACT

A computer-implemented method for classifying an unclassified process as a potentially trusted process based on dependencies of the unclassified process is described. A component loaded by the unclassified process is identified. A determination is made as to whether a hard dependency exists between the unclassified process and the loaded component. A hard dependency exists if the unclassified process depends on the loaded component in order to execute. The unclassified process is classified as a potentially trusted process if a hard dependency exists between the unclassified process and the loaded component.

18 Claims, 7 Drawing Sheets

SYSTEMS AND METHODS FOR CLASSIFYING AN UNCLASSIFIED PROCESS AS A POTENTIAL TRUSTED PROCESS BASED ON DEPENDENCIES OF THE UNCLASSIFIED PROCESS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve security related to sensitive information that may be stored on a computer and/or shared between users of multiple computers. For example, users of computer technologies may desire to identify unknown process as trusted or malicious before a malicious process damages or destroys information stored on a computer.

Malicious processes mask themselves as valid, trusted processes. Security measures implemented on a computer may not detect these malicious processes before they have rendered damage to sensitive data on the computer. As a result, benefits may be realized by providing systems and methods for correctly identifying or classifying processes as trusted or malicious. In particular, benefits may be realized by providing improved systems and methods for classifying an unclassified process as a potential trusted process based on dependencies of the unclassified process.

SUMMARY

According to at least one embodiment, a computer-implemented method for classifying an unclassified process as a potentially trusted process based on dependencies of the unclassified process is described. A component loaded by the unclassified process is identified. A determination is made as to whether a hard dependency exists between the unclassified process and the loaded component. A hard dependency exists if the unclassified process depends on the loaded component in order to execute. The unclassified process is classified as a potentially trusted process if a hard dependency exists between the unclassified process and the loaded component.

In one embodiment, one or more characteristics of the loaded component may be compared with one or more characteristics of the unclassified process. The unclassified process may be classified as a potential malicious process upon a determination that the one or more characteristics of the loaded component are not similar to the one or more characteristics of the unclassified process. A directory in which the unclassified process is located may be identified and a directory in which the loaded component is located may be identified.

In one configuration, the unclassified process may be classified as a potential trusted process if the loaded component is located in the same directory as the unclassified process. The process may be maintained as an unclassified process if the loaded component is located in a common component directory. A determination may be made as to whether the loaded component is loaded by one or more classified trusted processes. The unclassified process may be classified as a potential trusted process upon a determination that the loaded component is also loaded by one or more classified trusted processes. The common component directory may include operating system (OS) directories c:\windows and c:\windows\system32.

A computer system configured to classify an unclassified process as a potentially trusted process based on dependencies of the unclassified process is also described. The computer system may include a processor and memory in electronic communication with the processor. The computer system may also include a behavioral classification system configured to identify a component loaded by the unclassified process. The behavioral classification system may also be configured to determine whether a hard dependency exists between the unclassified process and the loaded component. A hard dependency exists if the unclassified process depends on the loaded component in order to execute. The behavioral classification system may also be configured to classify the unclassified process as a potentially trusted process if a hard dependency exists between the unclassified process and the loaded component.

A computer-program product for classifying an unclassified process as a potentially trusted process based on dependencies of the unclassified process is also described. The computer-program product may include a computer-readable medium having instructions thereon. The instructions may include code programmed to identify a component loaded by the unclassified process. The instructions may also include code programmed to determine whether a hard dependency exists between the unclassified process and the loaded component. A hard dependency exists if the unclassified process depends on the loaded component in order to execute. The instructions may further include code programmed to classify the unclassified process as a potentially trusted process if a hard dependency exists between the unclassified process and the loaded component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
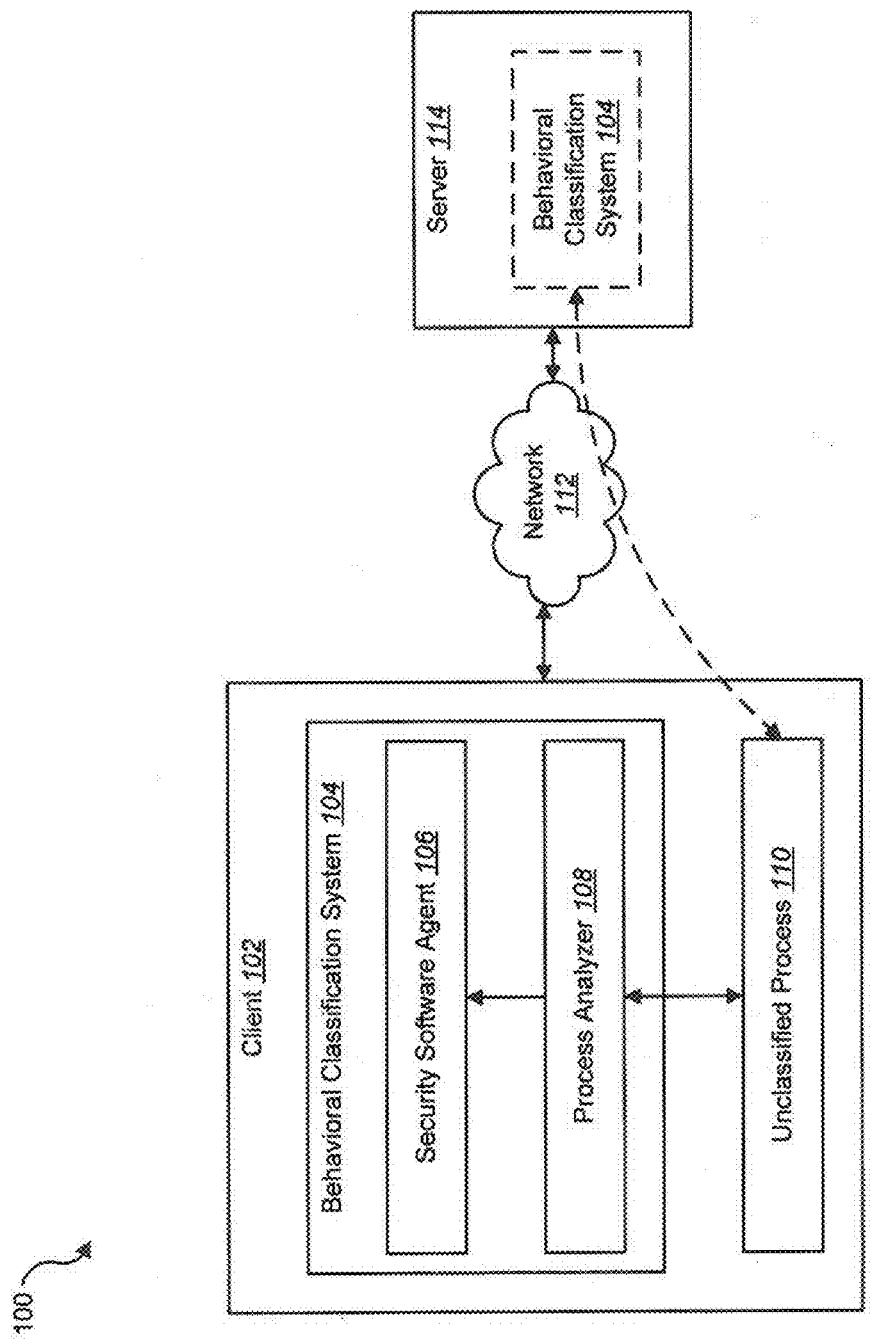
FIG. 1 is a block diagram illustrating one embodiment of a client computing device communicating with a server across a network communication.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many types of malware may be stand alone pieces of binaries. In contrast, legitimate software may have external dependencies or component requirements in order to run properly. A process that fails to run because it is in a controlled environment may be easily identified. In addition, a process that fails to run because of a lack of dependencies may also be easily identified. An operating system (OS) may log error codes in order to identify these failed processes. In one example, a process that fails to run because of a lack of dependencies may often be legitimate software. In contrast a process that fails to run because it is in a controlled environment may often be malware. A classification system may be used to classify processes as a trusted process (i.e., legitimate software), a suspicious process, or a malicious process (i.e., malware) based on certain inputs, such as the reason the process failed to run.

Another example of an input that may be used by the classification system is the existence of trust markers associated with the process. An example of a trust marker may include a digital signature. If a process lacks verifiable trust markers, such as a digital signature, the process may not be immediately recognized by the classification system as a trusted process. The classification system may include a security software agent. The agent may attempt to classify the process as trusted, suspicious, or malicious. The present systems and methods describe a heuristic approach to identifying a process as a potentially trusted process by analyzing the design of the process. In one example, a process may be a potentially trusted process if it has hard dependencies on one or more components. In one configuration, a hard dependency is not a dependency on a shared component. Shared components may be loaded by processes from shared component directories, such as an OS install directory (e.g., c:\windows, c:\windows\system32, etc.) If a process loads shared components (i.e., components found in shared component directories or components also loaded by other processes) the process may not be classified as trusted or malicious. The classification of the process may remain in an unknown or suspicious state.

In one example, the design (or structure) of a potentially trusted process (such as a portable executable (PE) process) may require the process to load custom and/or specific dynamically linked libraries (DLLs). The intended purpose of these custom and/or specific DLLs may be to allow the process to execute. In other words, the process may be deemed to have external custom components and hard dependencies (i.e., the custom and/or specific DLLs). In one embodiment, processes that have custom components and hard dependencies may be classified as a potentially trusted component with a high degree of confidence. Malicious processes are typically mobile and may be hindered if they have custom components and hard dependencies. As a result, an unclassified process may be identified as trusted or malicious based partly on whether the process depends on one or more custom components to run properly.

FIG. 1 is a block diagram illustrating one embodiment of a client computing device 102 communicating with a server 114 across a network communication 112. The client computing device 102 may be a personal computer (PC), a laptop, a tablet, an Ultra Mobile Device (UMD), a personal digital assistant (PDA), a smartphone, and the like. In one embodiment, the client 102 may include a behavioral classification system 104. The system may analyze and classify an unclassified process 110 that may be executed (or executing) on the client 102. For example, the behavioral classification system 104 may classify the unclassified process 110 as a potential trusted process, a suspicious (or unknown) process, or a potential malicious process based on the analysis of the unclassified process 110.

In one configuration, the behavioral classification system 104 may include a security software agent 106 and a process analyzer 108. In one example, the process analyzer 108 may analyze certain characteristics of the unclassified process 110. The security software agent 106 may use the analysis provided by the process analyzer 108 to classify the unclassified process 110. Although the behavioral classification system 104 is illustrated on the client computing device 102, it is to be understood that the behavioral classification system 104 may reside on the server 114. In one embodiment, if the behavioral classification system 104 resides on the server 114, the system 104 may analyze and classify the unclassified process 110 across the network connection 112.

Figure 2:
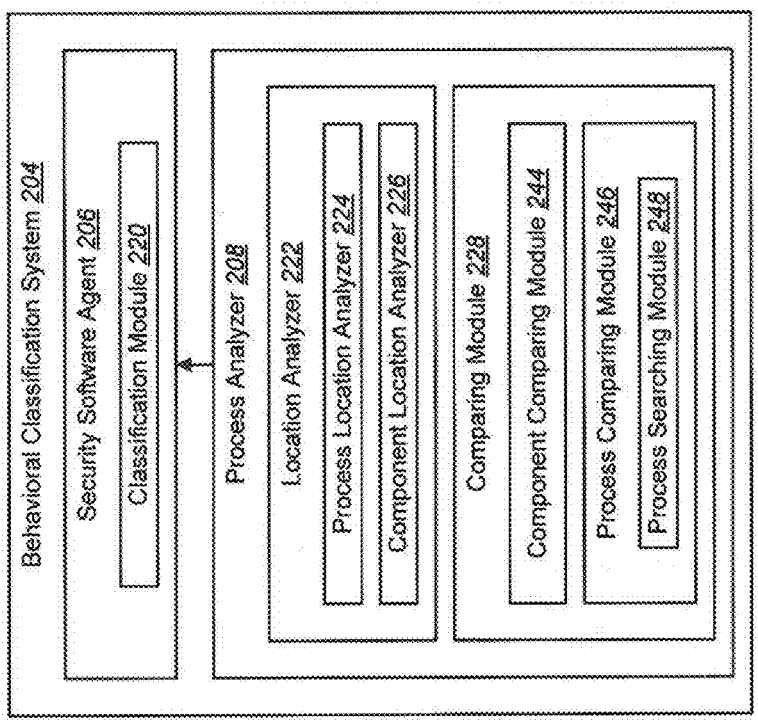
FIG. 2 is a block diagram illustrating a further embodiment of a behavioral classification system.

FIG. 2 is a block diagram illustrating a further embodiment of a behavioral classification system 204. In one configuration, the classification system 204 may analyze and classify an unclassified process. For example, the classification system 204 may classify a process as potentially trusted, suspicious, or potentially malicious based on the analysis.

In one example, the behavioral classification system 204 may include a security software agent 206. The agent 206 may include a classification module 220. The module 220 may assign a classification to an unclassified process. In one embodiment, the process may be a PE file, an application, etc. The behavioral classification system 204 may also include a process analyzer 208 that may analyze certain characteristics of the unclassified process.

The classification system 204 may classify a process as a potentially trusted process if the process has hard dependencies on one or more components. In one embodiment, the system 204 may determine that the process has hard dependencies if a component loaded by the process is located in a specific directory (e.g., the current directory of the process itself). In one configuration, the specific directory is not a common component directory or path where components may be found and loaded by other processes. As a result, the process analyzer 208 may include a location analyzer 222. The location analyzer 222 may include a process location analyzer 224 and a component location analyzer 226. In one example, the process location analyzer 224 may determine the directory of the unclassified process. The component location analyzer 226 may identify or determine the directory of a component that the unclassified process loads.

In one configuration, the system 204 may also identify the existence of hard dependencies if a hard file dependency of a binary file itself exists. For example, by virtue of a binary structure of a PE file format, a component (such as a DLL) may be required to be in an import address table of a process. If the DLL is not found during the loading of the process, the process may fail to execute properly.

In one embodiment, the process analyzer 208 may further include a comparing module 228. The comparing module 228 may include a component comparing module 244 and a process comparing module 246. In one configuration, the component comparing module 244 may analyze and compare a component loaded by the unclassified process with components loaded by one or more other processes that have been previously classified. For example, the comparing module 244 may determine if a component loaded by the unclassified process is similar or different to a component loaded by another process that has already been classified. In addition, the component comparing module 244 may compare certain characteristics of the loaded components with certain characteristics of the unclassified process. For example, the component comparing module 244 may determine if there are similarities between the components and the unclassified process, such as compiler similarities, version information similarities, file time similarities, etc. If the module 244 determines that similarities exist between the loaded components and the unclassified process, it may be determined that the loaded components are custom and specific to the unclassified process. In other words, the comparing module 244 may determine that the unclassified process depends on these components in order to execute properly.

The process comparing module 246 may determine whether classified processes have loaded components similar to the components loaded by the unclassified process. For example, if no other classified processes have loaded components similar to the components loaded by the unclassified process, the unclassified process may be determined to be dependent upon these components. In one embodiment, a process searching module 248 may search for these classified processes that have loaded components similar to the components loaded by the unclassified process. The classification module 220 may then classify the unclassified process based on the analysis provided by the process analyzer 208.

Figure 3:
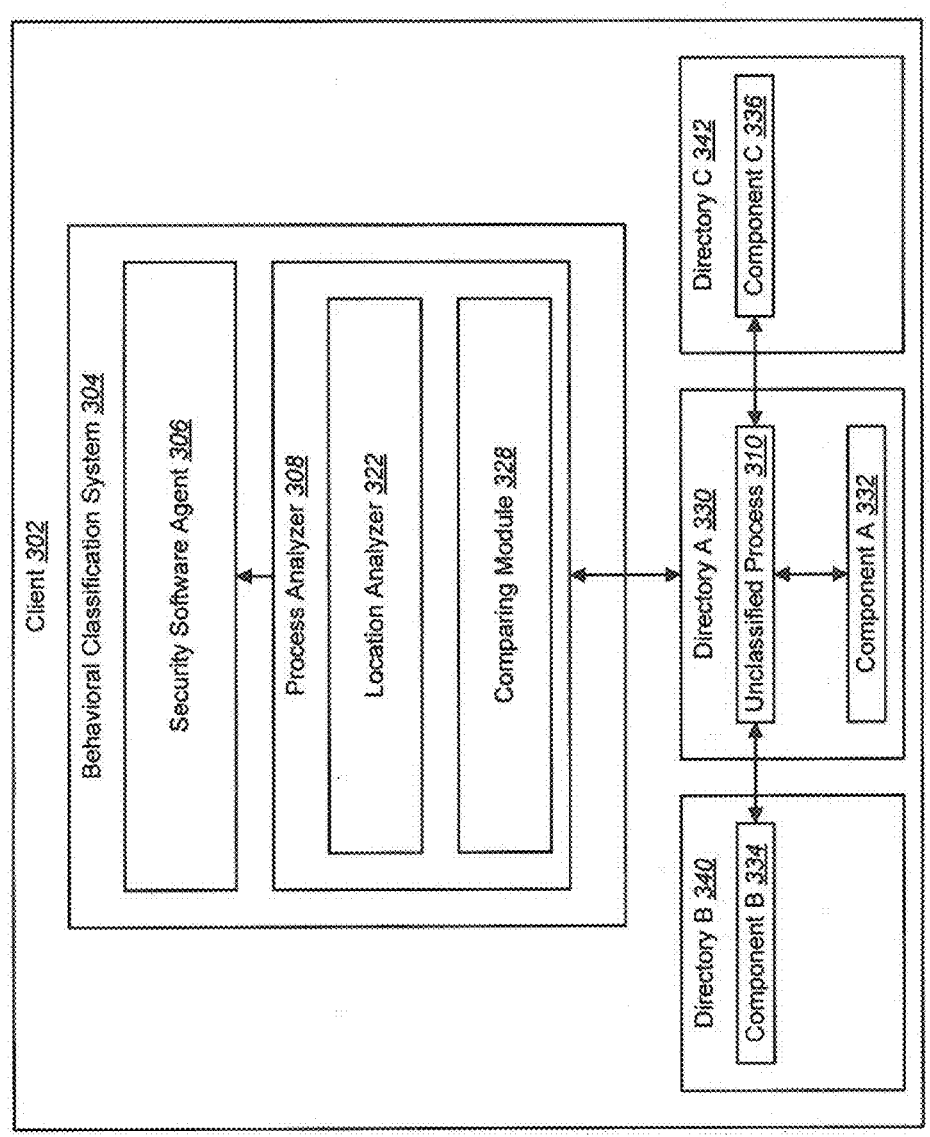
FIG. 3 is a block diagram illustrating a further embodiment of a client computing device.

FIG. 3 is a block diagram illustrating a further embodiment of a client computing device 302. The client 302 may include a behavioral classification system 304. As previously explained, the behavioral classification system 304 may include a security software agent 306 and a process analyzer 308. The process analyzer 308 may include a location analyzer 322 and a comparing module 328 as previously described.

In one configuration, an unclassified process 310 may be executed in directory A 330. The process analyzer 308 may determine whether directory A 330 is a common directory with shared components that may be loaded by additional processes. Examples of shared component locations may include OS directories, such as, but not limited to, c:\windows, c:\windows\system32, etc. In one example, component B 334 and component C 336 may each be stored in a common directory, such as directory B 340 and directory C 342. Component A 332 may be stored in an uncommon directory, such as directory A 330.

In one configuration, the unclassified process 310 may load component A 332 from directory A 330. As previously mentioned, directory A 330 may not be a common directory with shared components that may be loaded by additional processes. The security software agent 306 may classify the process 310 as a potential trusted process because it 310 is executed in an uncommon directory (i.e., directory A 330) and the component (i.e., component A 332) loaded by the process 310 is also in the uncommon directory 330. In other words, the process analyzer 308 may determine that the unclassified process 310 depends on a custom component, such as component A 332, in order to execute properly.

If the unclassified process 310 loads component B 334 and/or component C 336 from directories 340, 342 that include shared components used by other processes, the process analyzer 308 may determine that the unclassified process 310 does not have a unique dependency on component B 334 and/or component C 336. In other words, component B 334 and component C 336 may be shared components that are common to various processes running on the client 302. The security software agent 306 may classify the process 310 as a suspicious (or unknown) process. In other words, the security software agent 306 may not be able to classify the process as a potentially trusted process or, conversely, a potentially malicious process.

The process analyzer 308 may also determine whether a hard file dependency of the binary file itself exists. For example, the analyzer 308 may determine whether the unclassified process requires a specific component (such as a DLL) in order to run properly.

In one embodiment, the process analyzer 308 may determine the type of directory the unclassified process 310 is running in based on the analysis of the location analyzer 322. The process analyzer 308 may also determine whether a component loaded by the unclassified process 310 is in the same directory as the unclassified process 310. The process analyzer 308 may determine the component location based on the location analyzer 322. In addition, the comparing module 328 may then compare the component loaded by the unclassified process 310 with components loaded by other classified processes. The security software agent 306 may classify the unclassified process 310 based on the analysis provided by the process analyzer 308. For example, if the unclassified process 310 loads component C 336 and the comparing module 328 determines that other trusted processes have also loaded component C 336, the security software agent 306 may classify the process 310 as a potentially trusted process.

Figure 4:
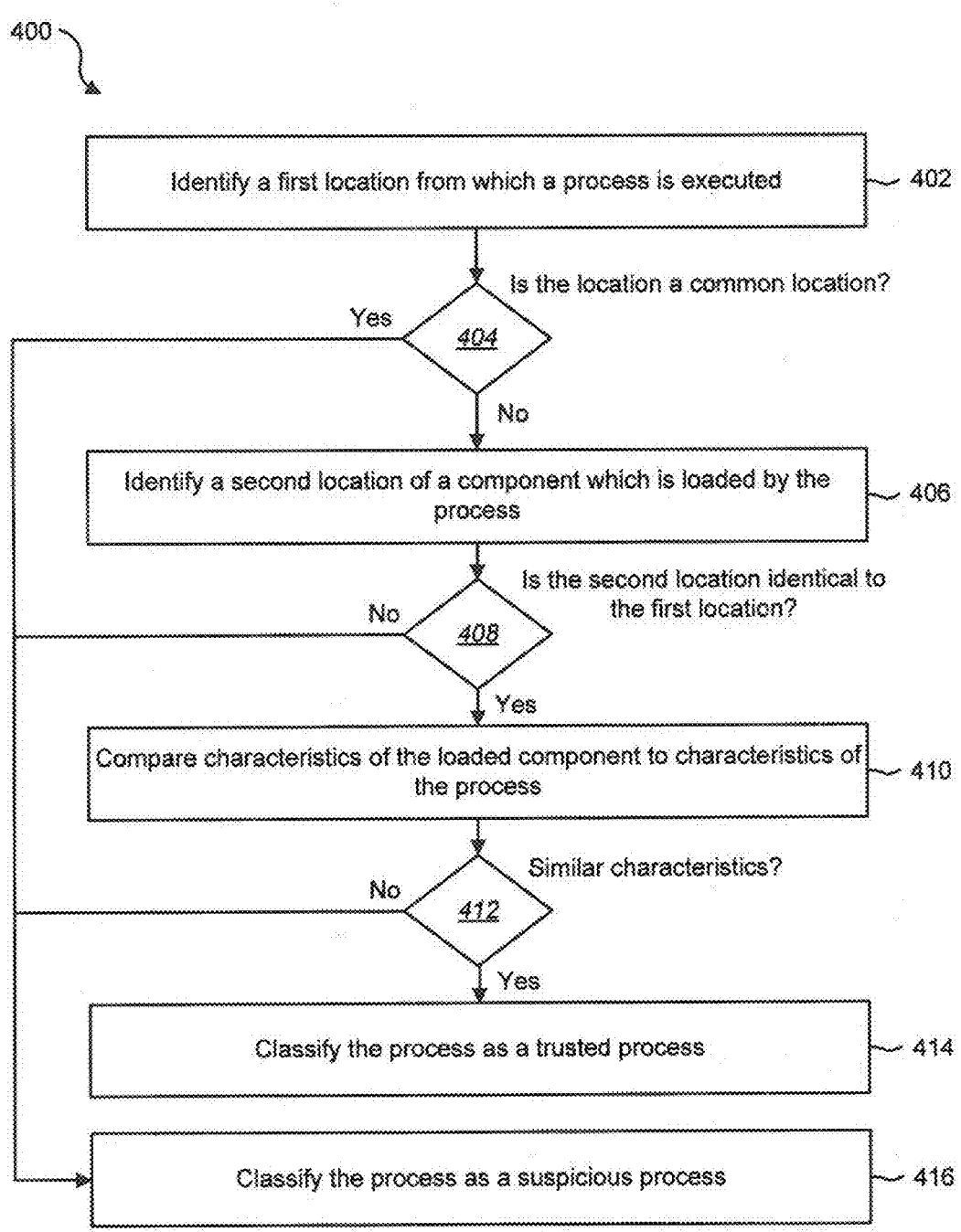
FIG. 4 is a flow diagram illustrating one embodiment of a method for classifying a process based on one or more dependencies of the process.

FIG. 4 is a flow diagram illustrating one embodiment of a method 400 for classifying a process based on the design of the process. In one embodiment, the method 400 may be implemented by a behavioral classification system 104.

In one configuration, a first location may be identified 402 as the location from which the process is executed on a client computing device 102. A determination 404 may be made as to whether the first location is a common location. A common location may be the location of components that are common to additional processes executed on the client computing device 102. If it is determined 404 that the first location is a common location, the process may continue to be classified 412 as a suspicious (or unclassified) process.

If, however, it is determined 404 that the first location is not a common location, a second location may be identified 406. The second location may be the location of a component that the process loads. A determination 408 may be made as to whether the second location is identical to the first location. In other words, the determination 408 determines whether the location of the component loaded by the process is the same location of the process. If it is determined 408 that the second location is not identical to the first location, the process may continue to be classified 416 as a suspicious (or unclassified) process. If, however, it is determined 408 that the second location is identical to the first location, characteristics of the loaded component may be compared 408 to characteristics of the process. For example, the component may be compared 408 to the process as to whether the process and the loaded component reflect similarities by compiler, version information, file times, etc.

A determination 412 may be made as to whether the characteristics of the loaded component and the characteristics of the process are similar. If it is determined 412 that the characteristics are not similar, the process may be classified 416 as a suspicious process. If, however, it is determined 412 that the characteristics of the loaded component are similar to the characteristics of the process, the process may be classified 414 as a potentially trusted process.

Figure 5:
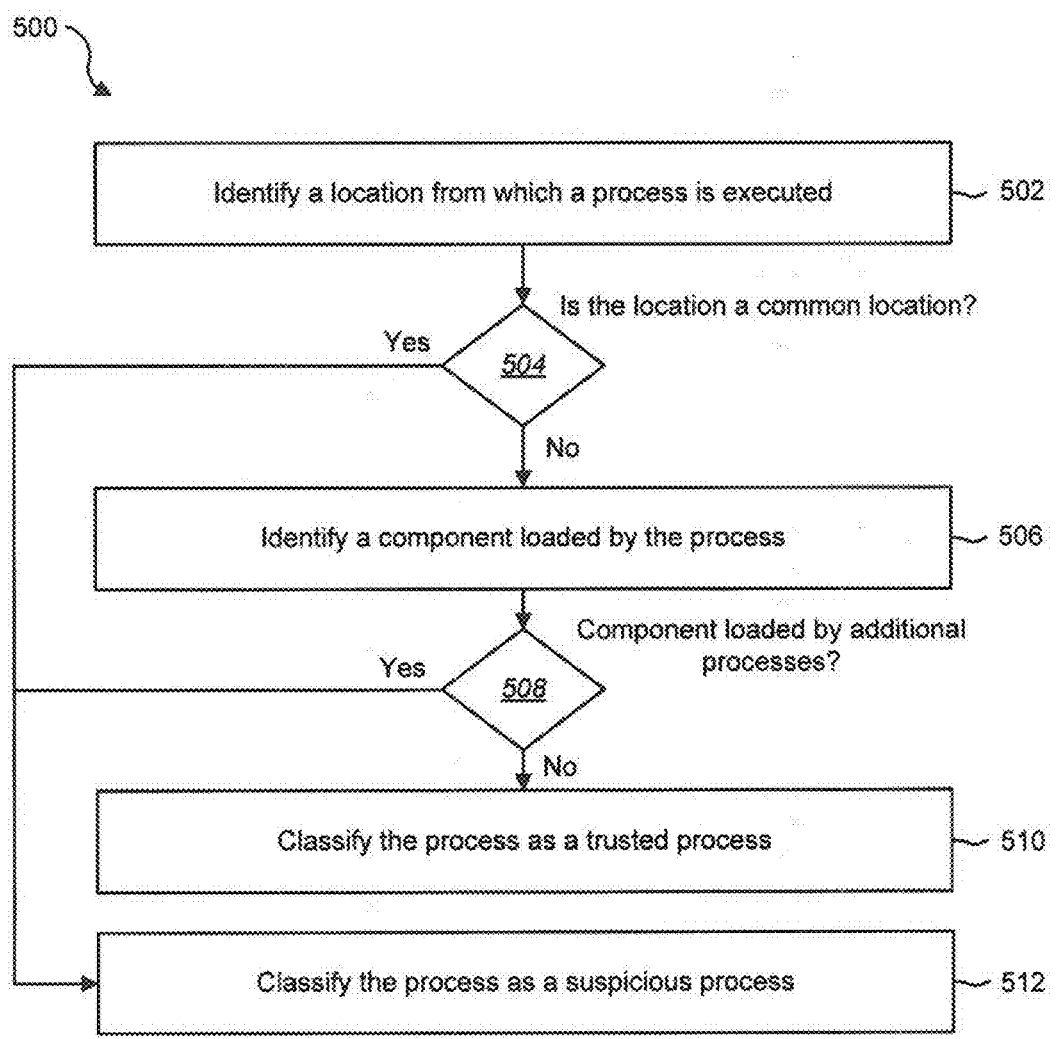
FIG. 5 is a flow diagram illustrating another embodiment of a method for classifying a process based on the dependencies of the process.

FIG. 5 is a flow diagram illustrating another embodiment of a method 500 for classifying a process based on the design of the process. The method 500 may be implemented by a behavioral classification system 104.

In one configuration, a location may be identified 502. In one example, a process is executed from the identified location. A determination 504 may be made as to whether the location is a common location. If it is determined 504 that the location is a common location, the process may continue to be classified 512 as a suspicious (or unclassified) process. If, however, it is determined 504 that the location is not a common location, a component loaded by the process may be identified 506.

A determination 508 may be made as to whether the component is loaded by other processes. If it is determined 508 that the component is also loaded by other processes, the process may be classified 512 as a potential malware process. If, however, it is determined 508 that the component is not loaded by other processes, the process may be classified 510 as a potential trusted process. If the component is only loaded by the process, it may be determined that the process has external dependencies on the loaded component that may be unique to the process. As a result, the process may not be mobile because it depends on a specific component in order to execute properly. Malicious processes are designed to be portable. In order to be mobile, malware processes may have minimal (if any) dependencies on other components in order to execute properly.

Figure 6:
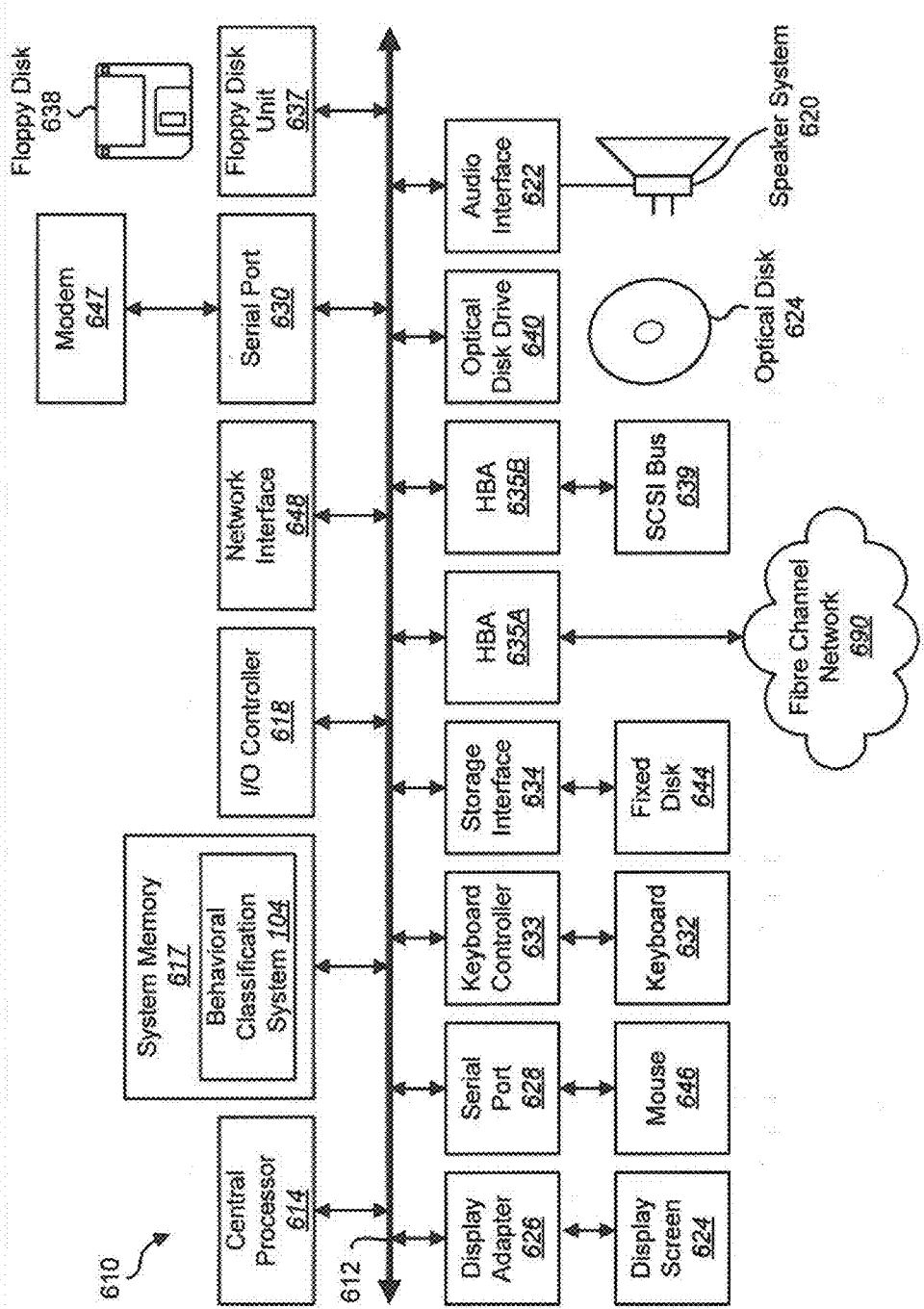
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the behavioral classification system 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
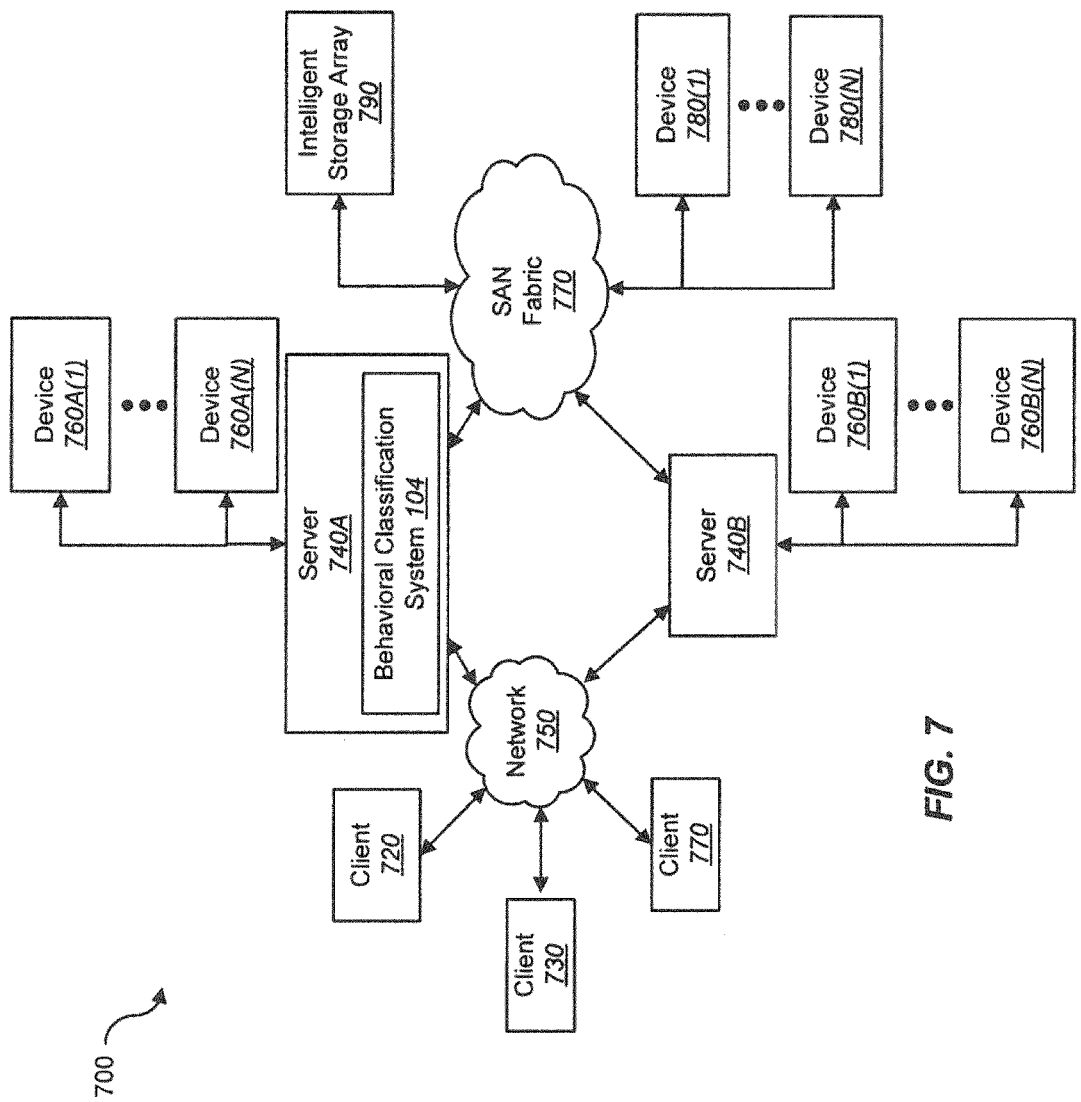
FIG. 7 is a block diagram depicting a network architecture in which client systems, as well as storage servers are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the behavioral classification system 104 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for classifying an unclassified process as a potentially trusted process based on dependencies of the unclassified process, comprising:
   identifying a component loaded by the unclassified process;
   determining whether software code from the unclassified process depends on the component loaded by the unclassified process in order to execute, wherein the determining comprises, at least in part, identifying a file system directory in which the unclassified process is located and a file system directory in which the loaded component is located; and
   upon determining that the software code from the unclassified process depends on the loaded component in order to execute, classifying the unclassified process as a potentially trusted process.

2. The method of claim 1, further comprising comparing one or more characteristics of the loaded component with one or more characteristics of the unclassified process.

3. The method of claim 2, further comprising classifying the unclassified process as a potential malicious process upon a determination that the one or more characteristics of the loaded component are not similar to the one or more characteristics of the unclassified process.

4. The method of claim 1, further comprising classifying the unclassified process as a potential trusted process if the loaded component is located in the same directory as the unclassified process.

5. The method of claim 1, further comprising maintaining the process as an unclassified process if the loaded component is located in a common component directory.

6. The method of claim 5, wherein the common component directory comprises operating system (OS) directories c:\windows and c:\windows\system32.

7. The method of claim 1, further comprising determining if the loaded component is loaded by one or more classified trusted processes.

8. The method of claim 7, further comprising classifying the unclassified process as a potential trusted process upon a determination that the loaded component is also loaded by one or more classified trusted processes.

9. A computer system configured to classify an unclassified process as a potentially trusted process based on dependencies of the unclassified process, comprising:
   a processor;
   memory in electronic communication with the processor;
   instructions stored in the memory, the instructions being executable by the processor to:
      identify a component loaded by the unclassified process;
      determine whether software code from the unclassified process depends on the component loaded by the unclassified process in order to execute, wherein the instruction to determine comprises, at least in part, an instruction to identify a file system directory in which the unclassified process is located and a file system directory in which the loaded component is located; and upon determining that the software code from the unclassified process depends on the loaded component in order to execute, classify the unclassified process as a potentially trusted process.

10. The computer system of claim 9, wherein the instructions are executable by the processor to:
compare one or more characteristics of the loaded component with one or more characteristics of the unclassified process.

11. The computer system of claim 10, wherein the instructions are executable by the processor to:
classify the unclassified process as a potential malicious process upon a determination that the one or more characteristics of the loaded component are not similar to the one or more characteristics of the unclassified process.

12. The computer system of claim 9, wherein the instructions are executable by the processor to:
classify the unclassified process as a potential trusted process if the loaded component is located in the same directory as the unclassified process.

13. The computer system of claim 9, wherein the instructions are executable by the processor to:
maintain the process as an unclassified process if the loaded component is located in a common component directory.

14. The computer system of claim 13, wherein the common component directory comprises operating system (OS) directories c:\windows and c:\windows\system32.

15. The computer system of claim 9, wherein the instructions are executable by the processor to:
determine if the loaded component is loaded by one or more classified trusted processes.

16. The computer system of claim 15, wherein the instructions are executable by the processor to:
classify the unclassified process as a potential trusted process upon a determination that the loaded component is also loaded by one or more classified trusted processes.

17. A computer-program product for classifying an unclassified process as a potentially trusted process based on dependencies of the unclassified process, the computer-program product comprising a non-transitory computer-readable medium storing instructions thereon, the instructions being executable by the processor to:
identify a component loaded by the unclassified process;
determine whether software code from the unclassified process depends on the component loaded by the unclassified process in order to execute, wherein the instruction to determine comprises, at least in part, an instruction to identify a file system directory in which the unclassified process is located and a file system directory in which the loaded component is located; and
upon determining that the software code from the unclassified process depends on the loaded component in order to execute, classify the unclassified process as a potentially trusted process.

18. The computer-program product of claim 17, wherein the instructions are executable by the processor to:
compare one or more characteristics of the loaded component with one or more characteristics of the unclassified process.

\* \* \* \* \*